April 19, 1955   J. M. MARSHALL   2,706,640
STAIR CLIMBING HAND TRUCK
Filed Jan. 12, 1951   2 Sheets-Sheet 1
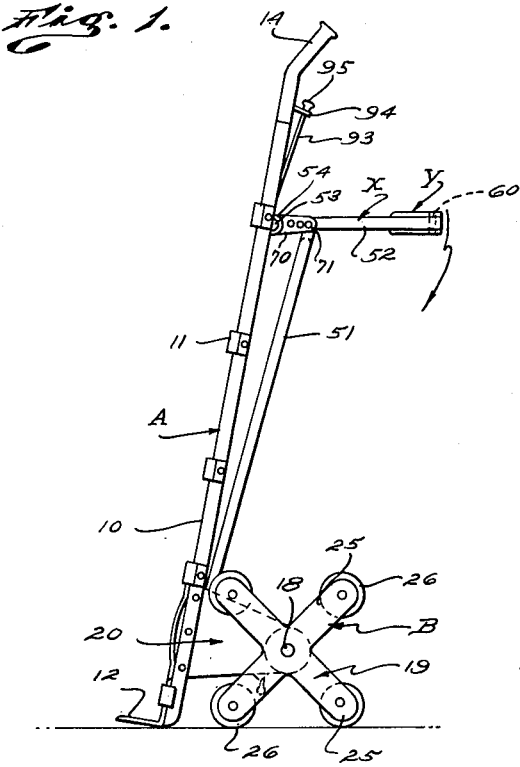
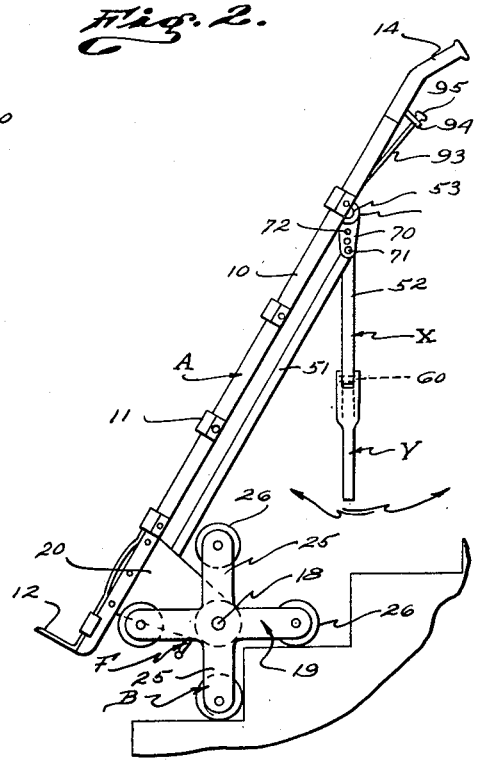
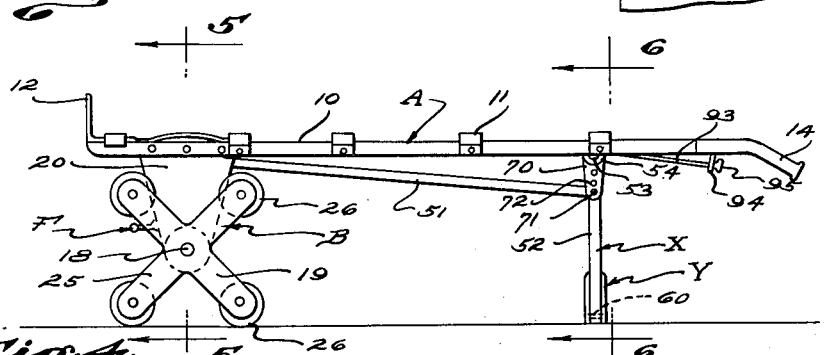
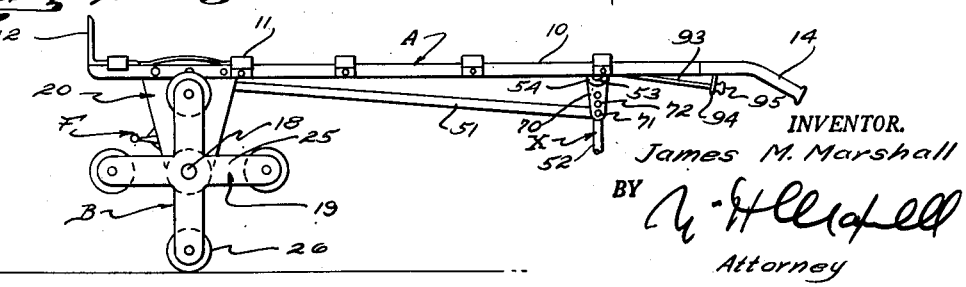
INVENTOR.
James M. Marshall
BY
Attorney April 19, 1955     J. M. MARSHALL     2,706,640
STAIR CLIMBING HAND TRUCK
Filed Jan. 12, 1951     2 Sheets-Sheet 2
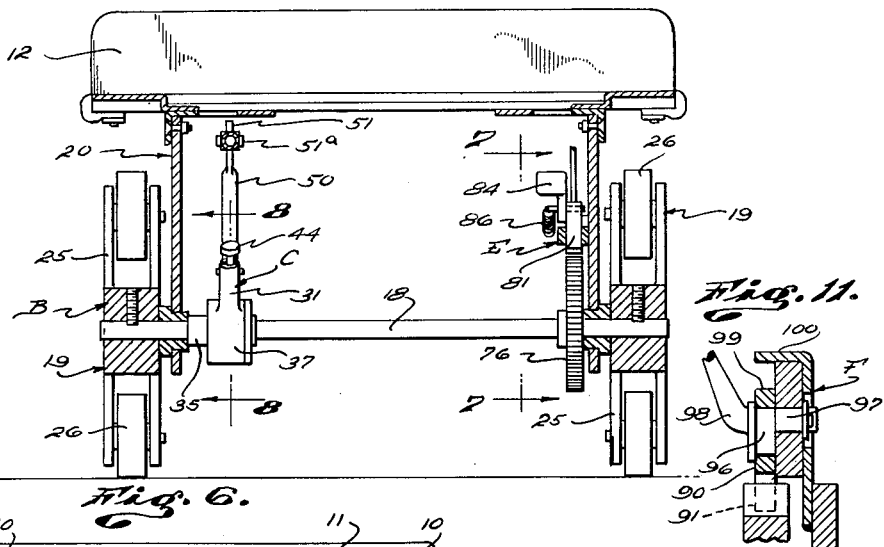
INVENTOR.
James M. Marshall
BY
Attorney

United States Patent Office 2,706,640
Patented Apr. 19, 1955

2,706,640

STAIR CLIMBING HAND TRUCK

James M. Marshall, Long Beach., Calif., assignor of one-third to Walker D. McMahan and one-third to Frank L. Rogers, Long Beach, Calif.

Application January 12, 1951, Serial No. 205,681

9 Claims. (Cl. 280—5.26)

This invention has to do with a hand truck and it is a general object of the invention to provide a simple, practical, improved mechanism or truck that can be used to advantage for the handling of articles or objects such, for example, as trunks, packing cases, and the like.

A general object of the present invention is to provide a hand truck of the general character referred to that can be easily, conveniently, and safely employed for the handling of heavy objects or articles in situations where it is necessary to move such objects or articles over obstacles or either up or down stairs, or the like.

Another object of the present invention is to provide a hand truck of the general character referred to including a simple practical dependable and effective mechanism serving to operate the star wheel support provided for the truck so that a person can handle the truck from its rear end and at the same time operate it in a manner either to advance it or to retract it, as circumstances require.

A further object of the invention is to provide a truck of the general character referred to including a lock means that is simple, practical, and easily operated and which serves to positively lock the star wheel support of the truck in any desired rotative position.

The various objects and features of my invention will be fully understood from the following detailed description of a typical preferred form and application of the invention, throughout which description reference is made to the accompanying drawings, in which:

Fig. 1 is a side elevation of a hand truck embodying the present invention, showing it in a typical position ready to be loaded, as by engaging the lip of the frame beneath an object or article that is to be carried. Fig. 2 is a view similar to Fig. 1, showing the truck engaged with or in position to operate over stairs. Fig. 3 is a view similar to Fig. 1, showing the truck positioned with the frame down or horizontally disposed and showing the manner in which it can be effectively supported in a horizontal position and at one height. Fig. 4 is a view similar to Fig. 3 showing the truck supported in a horizontal position and at a different height. Fig. 5 is an enlarged detailed transverse sectional view taken as indicated by line 5—5 on Fig. 3. Fig. 6 is an enlarged detailed sectional view taken as indicated by line 6—6 on Fig. 3. Fig. 7 is an enlarged detailed sectional view taken as indicated by line 7—7 on Fig. 5. Fig. 8 is an enlarged detailed transverse sectional view as indicated by line 8—8 on Fig. 5. Fig. 9 is a view taken as indicated by line 9—9 on Fig. 8. Fig. 10 is a sectional view taken as indicated by line 10—10 on Fig. 8, and Fig. 11 is an enlarged detailed sectional view taken as indicated by line 11—11 on Fig. 7.

The hand truck as provided by the present invention involves, generally, an elongate frame A, a support B for the frame characterized by a star wheel type rotor and mounting means connecting the rotor and the frame at the forward end thereof, operating means C for the rotor, control means D cooperatively related to the operating means C, lock means E operable to set the rotor against operation in either direction, and releasing means F operable to allow the rotor to turn slowly or by degrees, when such action is desired or necessary as when descending a stairway, or the like.

The frame A is preferably a simple flat elongate structure or element and in the case illustrated it is elongate in form and is characterized by longitudinally disposed side rails 10 and a plurality of transverse members or spacers 11 that extend transversely of the frame and between the rails 10. In the case illustrated the frame is provided at its forward end with an upwardly projecting lip 12 serving to retain articles or objects on the truck in the course of operation thereof. The frame is further provided at its rear end with handles 14. The handles are rigid with the frame. In the preferred construction the handles are integral or rigid extensions of the side rails 10 of the frame and they are formed to extend rearwardly and somewhat downwardly from the rear end of the frame, as clearly shown throughout the drawings.

The support B for the frame is provided at the forward end portion of the frame and at the lower side thereof. In accordance with the invention the support B includes a rotor that involves a shaft 18 and star wheels 19 on the shaft. Mounting brackets 20 depend from the frame and carry the shaft. In the case illustrated the brackets 20 are flat plate-like parts joined or fixed to the side rails of the frame, and they depend therefrom to support the shaft 18 so that it is freely rotatable and extends transversely of the frame a suitable distance beneath the frame.

The star wheels 19 are preferably fixed on the end portions of the shaft 18 and in the case illustrated they are at the outer sides of the brackets 20. The star wheels are alike and are in like rotative positions on the shaft 18 and each star wheel is characterized by a plurality of radially projecting arms 25. In the case illustrated each star wheel has four arms and the several arms are spaced 90° apart, as shown throughout the drawings. Through this construction the rotor can be positioned as shown in Fig. 3 where the forward end of the frame is supported in a lowermost position or it can be positioned as shown in Fig. 4 so that a single arm of the rotor depends and thus supports the frame at a maximum height.

In the preferred form of the invention each arm of each star wheel is bifurcated and carries a roller 26. A typical star wheel construction and arrangement is shown throughout the drawings.

The operating means provided for operating the rotor of the support is essentially a ratchet mechanism manually operable by a person operating the truck and serving to rotate the rotor in either direction, depending upon the manner in which the mechanism is set. In the particular case illustrated the operating means C includes a ratchet wheel 30 fixed on the rotor shaft 18, an arm 31 rotatably mounted to turn about the center of the rotor shaft, and a pawl 32 carried by the arm and cooperating with the ratchet wheel 30. In the case illustrated the ratchet wheel has a sleeve portion 35 carried on the shaft 18 and projecting axially in either direction from the teeth 36 of the ratchet wheel. The arm 31 has a hub portion 37 rotatably supported on the sleeve 35 and may embrace the teeth 36, in the manner clearly illustrated in Figs. 8 and 10 of the drawings. The pawl 32 is shown as slidably carried by the arm 31, being engaged in a guideway 38 provided in the arm. A spring 39 is carried by the arm and engages the pawl to normally yieldingly urge it into cooperative engagement with the ratchet wheel 30. The pawl has a flat tooth engaging front face 40 and has an inclined rear face 41. A stem 42 projects from the pawl to the exterior of the arm 31 where it is provided with a knob 44. When the pawl is positioned as shown in Fig. 8 the ratchet mechanism will drive the rotor in one direction upon oscillation of the arm 31, whereas if the pawl is rotated through 180° it will operate the rotor in the opposite direction when the arm 31 is oscillated. A lock means is provided for locking the pawl in either of these positions. In the case illustrated the lock means involves a pin 45 carried by the stem and normally engaged in a transverse notch 46 provided in the arm. The structure is such that the stem 42 can be operated or elevated to disengage the pin from the notch in which the stem can be rotated to move the pawl to any desired rotative position. When the pin is engaged in the notch the pawl is in either one or the other of the operating positions hereinabove described.

The arm 31 has a projecting portion or extension 50 to which a link 51 is attached, as by means of a pivot pin 51ᵃ.

The link 51 extends rearwardly of the frame from the arm extension 50 to an operating lever 52 located at the rear end portion of the frame. The lever 52 is provided with a rocker shaft 53 carried by suitable bearings 54 at the rear end portion of the frame. The lever 52 is carried by the rocker shaft so that it is about midway between the side rails 10 of the frame and it projects downwardly from the frame to be conveniently accessible to a person manipulating the truck by means of the handles thereof. In the preferred form of the invention the lever 52 is sectional or is of folding construction. In the case illustrated the lever 52 is shown as involving an inner section X fixed to the rocker shaft 53 and an outer or handle section Y joined to the end of section X by a pivot pin 60. The pin 60 is disposed transversely of the operating lever and is so positioned about the axis of the lever that when the lever sections are in the extended position, as shown in Fig. 2, the lever can be operated as indicated by the arrows in Fig. 2, as a rigid unit and without the sections pivoting relative to each other.

When the section Y is folded in as shown in Figs. 1 and 6, and the inner section X depends down from the frame, the lower or outer end of the section X may engage a support such as a floor and thus support the rear end portion of the truck at a suitable elevation above the floor. The length of lever section X can be related to the rotor so that the rotor can be positioned in such manner that when the section X is used as shown in Figs. 3 and 6 the frame is substantially horizontal. The outer section Y of the lever can be of such length that when it is extended to be in line with the section X, as shown in Fig. 2, it can be used either as a handle to facilitate operation of the lever or it can be engaged with a support such as a floor, and thus support the rear end portion of the frame in a predetermined manner. The lever 52 constructed as hereinabove described can be used to operate the link when the sections are folded as shown in Fig. 6, or when extended, as shown in Fig. 2.

The link 51 is suitably connected to or with the lever 52 so that it is operated or oscillated when the lever is operated. In the case illustrated the link 51 is not connected directly to the operating lever, but is connected to a link arm 70 on the rocker shaft 53. A pivot pin 71 connects the link 51 of the link arm 70. It is preferred to provide the link arm 70 with a plurality of holes or openings 72 to receive the pivot pin 71 so that the leverage or mechanical advantage provided between the operating lever 52 and the arm extension 50 can be varied as circumstances require.

The control means D serves as a ratchet or latch means holding the rotor against reverse movement after it has been advanced by the means C in the direction indicated by the arrow in Fig. 7. The means D is shown as involving a control dog 73 carried by a pivot pin 74 and having an operating position where a lug 75 on the dog cooperates with the teeth of a ratchet wheel 76 fixed on the rotor shaft 18. A tension spring 77 is anchored at 78 and is attached to the control dog 73 to hold the dog in the operating position shown in full lines in Fig. 7, or a retracted position as shown in dotted lines in Fig. 7. As the control dog moves between the said positions the spring moves past the center of the pivot 74. When the control dog is in the retracted position it is in engagement with a stop 79. In the particular case illustrated the stop 79 and a suitable part carrying the pivot pin 74 are on one of the mounting brackets 20 at the inner side thereof. The control dog has an extension 80 projecting to a point where it is conveniently accessible to an operator of the truck, for instance, to a point where the operator can engage it with his foot to move it between the positions above described.

The lock means E is provided for positively locking the rotor against rotation in either direction independently of the operating means C, and also independently of the control means D. The lock means E involves a lock dog 81 with one or more lugs 82 cooperatively engaging the teeth of the ratchet wheel 76. In the case illustrated the dog 81 is carried by the mounting bracket 20 that supports the dog 73 and the dog 81 is so mounted as to slide or reciprocate between an active position where the lugs 82 engage the teeth of the ratchet wheel and a retracted position where the lugs 82 are removed from the ratchet wheel and the dog is in engagement with a stop 83.

An operating lever 84 is provided for operating the lock dog 81 between the two positions above described. The lever 84 is carried by a pivot pin 85 and a tension spring 86 has one end connected to the lever 84 and the other end anchored at 78. The spring moves past the center of the pivot 85 when the lever 84 is operated to move the lock dog between the two positions above mentioned. In the preferred form of the invention the operating lever 84 is so located and proportioned as to be accessible to the operator of the truck so that he can shift the lever between the positions shown in full and dotted lines in Fig. 7 by engaging the lever with his foot while holding the handles of the truck.

The releasing means F is operable to allow the rotor to turn slowly or by degrees and it is a manual control that can be used to advantage when the truck is heavily loaded and is being operated down stairs. Means F can be used as a safety means when the structure is being operated up stairs.

The means F preferably includes a pivotally mounted rocker 90 having spaced lugs 91 alternately or selectively engageable with teeth of the ratchet wheel 76. An arm 92 projects from the rocker and an operating rod 93 is connected to the arm 92 and extends rearwardly of the frame to the rear end portion thereof where it is carried by a guide 94 and is provided with an operating knob 95. Through the construction just described suitable operation or oscillation of the rod 93 effects rocking of the rocker 90 so that the lugs 91 thereof move into and out of engagement with the teeth, allowing the ratchet wheel 76 and the shaft 18 to which it is fixed to rotate the distance of one tooth at a time, or for each operation of the rocker.

The means F is such that the rocker 90 can be operated into and out of operating position as shown in Fig. 7, and in the case illustrated the rocker is rotatably supported by means of an eccentric pin 97 so that by rotation of the pin the rocker is shifted bodily through a cam or eccentric action and is thus moved into and out of the position shown in Fig. 7. When the rocker is moved to a retracted position both lugs 91 are clear of the ratchet wheel 76. A suitable handle 98 may be provided on the parts requiring operation to shift the position of the rocker as shown in Figs. 7 and 11 of the drawings. In the preferred form of the invention the rocker is provided with a flat shoulder 99 that cooperatively engages a stop 100 when the rocker is retracted, causing the rocker to be stopped in a position where both lugs 91 are clear of the ratchet wheel 76 so this ratchet wheel can move freely in either position.

From the foregoing description it will be apparent that I have provided a mechanism that is of simple, compact and inexpensive construction. The frame is a simple rigid unit that can be manipulated generally in the manner usual to hand trucks. The various mechanisms related to the frame can be operated separately or individually or in a manner to coact so that the truck operates as desired. With the mechanism that I have provided the rotor can be operated to any desired rotative position and it can be moved or ratcheted to such position by rotating it in either direction. Further, the rotor can be set or locked positively in any desired rotative position. As the operating means is employed to advance the rotor so that the truck is operated up a stairway, or the like, the control means D may be employed as a safety means to positively check return movement of the rotor. Further, when desired the means F can be put into operation, in which case the rotation of the rotor is under direct and full manual control of the operator and rapid or runaway operation of the truck can be prevented.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, and a lock means engageable to set the shaft against rotation and including, a ratchet wheel fixed on the shaft, a lock dog mounted to operate into and out of cooperative engagement with the ratchet wheel, and an over-center spring operative to releasably retain the dog in its engaged and disengaged positions.

2. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, and a lock means engageable to set the shaft against rotation and including, a ratchet wheel fixed on the shaft, a lock dog slidably carried by one of the brackets and movable into and out of locking engagement with the ratchet wheel, a pivoted operating lever coupled to the dog and shiftable between a position where it holds the dog engaged with the ratchet wheel and a position where the dog is retracted from the ratchet wheel, and an over-center spring operating to yieldingly hold the lever in said positions upon its being operated thereto.

3. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, a control mechanism including, a ratchet wheel fixed on the shaft, a pawl having a working position cooperating with the ratchet wheel and a retracted position clear of the ratchet wheel, and a spring engaging the pawl and releasably holding it in said positions upon its being operated thereto, and a lock means engageable to set the shaft against rotation and including, a dog carried by one of the brackets and movable into and out of engagement with said ratchet wheel, a pivoted operating lever coupled to the dog and operable to a position where it holds the dog engaged with said ratchet wheel and a position where it holds the dog disengaged from said ratchet wheel, and a spring yieldingly holding the lever in said positions upon its being operated thereto.

4. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, and a release means controlling rotation of the shaft and including, a ratchet wheel fixed on the shaft, and a single manually operated rocker with spaced lugs selectively engageable with the ratchet wheel.

5. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, and a release means controlling rotation of the shaft and including, a ratchet wheel fixed on the shaft, a rocker with spaced lugs, and a mounting supporting the rocker for bodily movement radially toward and away from the ratchet wheel between a position where the lugs are selectively engageable with the wheel and a position where the lugs are clear of the wheel.

6. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, a control mechanism including, a ratchet wheel fixed on the shaft, a pawl having a working position cooperating with the ratchet wheel and a retracted position clear of the ratchet wheel, and a spring engaging the pawl and releasably holding it in said positions upon its being operated thereto, a lock means engageable to set the shaft against rotation and including, a dog carried by one of the brackets and movable into and out of engagement with said ratchet wheel, a pivoted operating lever coupled to the dog and operable to a position where it holds the dog engaged with said ratchet wheel and a position where it holds the dog disengaged from said ratchet wheel, and a spring yieldingly retaining the lever in said positions upon its being operated thereto, and release means controlling rotation of the shaft and including, a manually controlled rocker with lugs selectively engageable with the ratchet wheel.

7. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, a control mechanism including, a ratchet wheel fixed on the shaft, a pawl having a working position cooperating with the ratchet wheel and a retracted position clear of the ratchet wheel, and a spring engaging the pawl and releasably holding it in said positions upon its being operated thereto, a lock means engageable to set the shaft against rotation and including, a dog carried by one of the brackets and movable into and out of engagement with said ratchet wheel, a pivoted operating lever coupled to the dog and operable to a position where it holds the dog engaged with said ratchet wheel and a position where it holds the dog disengaged from said ratchet wheel, and a spring yieldingly holding the lever in said positions upon its being operated thereto, and release means controlling rotation of the shaft and including, a rocker with spaced lugs, a mounting supporting the rocker for movement between an operating position where the lugs are engageable with the ratchet wheel and a position where the lugs are clear of the ratchet wheel, and manual operating means operating the rocker so the lugs selectively engage the ratchet wheel.

8. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, a control mechanism including, a ratchet member fixed on the shaft, a pawl having a working position cooperating with the ratchet member and a retracted position clear of the ratchet member, and a spring engaging the pawl and releasably holding it in said positions upon its being operated thereto, lock means engageable to set the shaft against rotation and including, a lock dog mounted to operate into and out of cooperative engagement with the ratchet member, and release means controlling rotation of the shaft and including, a manually controlled rocker with lugs selectively engageable with the ratchet member.

9. A hand truck including, an elongate frame with handles at one end and depending brackets at the other end, a rotor including, a shaft rotatably carried by the brackets and extending transversely of the frame and like star wheels fixed on the shaft, a manually operated ratchet mechanism adapted to rotate the shaft, a control mechanism including, a ratchet member fixed on the shaft, a pawl having a working position cooperating with the ratchet member and a retracted position clear of the ratchet member, and a spring engaging the pawl and releasably holding it in said positions upon its being operated thereto, lock means engageable to set the shaft against rotation and including, a lock dog mounted to operate into and out of cooperative engagement with the ratchet member, and release means controlling rotation of the shaft and including, a rocker with lugs spaced circumferentially of the ratchet member, a rotatable eccentric mounting supporting the rocker for bodily movement radially toward and away from the ratchet member between an operating position where the lugs are engageable with the ratchet member and a position where the lugs are clear of the ratchet member, and manual operating means operating the rocker so the lugs selectively engage the ratchet member.

References Cited in the file of this patent

UNITED STATES PATENTS

| | | |
|---|---|---|
| 843,034 | Ridgeway et al. | Feb. 5, 1907 |
| 849,270 | Schafer et al. | Apr. 2, 1907 |
| 1,056,848 | Starrett et al. | Mar. 25, 1913 |
| 1,191,394 | Brown et al. | July 18, 1916 |
| 1,551,127 | Whyel | Aug. 25, 1925 |
| 1,660,517 | Milliken | Feb. 26, 1928 |

FOREIGN PATENTS

| | | |
|---|---|---|
| 187,291 | Germany | June 24, 1907 |